United States Patent [19]

Acharekar et al.

[11] Patent Number: 5,099,486
[45] Date of Patent: Mar. 24, 1992

[54] FREQUENCY STABILIZED HO:YAG LASER

[75] Inventors: Madhu A. Acharekar, Orlando; Edward J. Adamkiewicz, Longwood, both of Fla.

[73] Assignees: Litton Systems, Inc., Beverly Hills, CA; Schwartz Electro-Optics, Inc., Orlando, Fla.

[21] Appl. No.: 691,259

[22] Filed: Apr. 25, 1991

[51] Int. Cl.[5] .................................... H01S 3/13
[52] U.S. Cl. ........................ 372/32; 372/94; 372/29; 372/28; 372/15; 372/12; 372/10; 356/350
[58] Field of Search ............ 372/32, 94, 10, 15, 372/12, 29, 28; 356/350

[56] References Cited

U.S. PATENT DOCUMENTS

| | | | |
|---|---|---|---|
| 4,108,553 | 8/1978 | Zampiello et al. | 356/106 |
| 4,383,763 | 5/1983 | Hutchings et al. | 356/350 |
| 4,715,713 | 12/1987 | Hutchings | 356/350 |
| 4,740,083 | 4/1988 | Curby et al. | 356/350 |
| 4,752,931 | 6/1988 | Dutcher et al. | 372/10 |
| 4,755,057 | 7/1988 | Curby et al. | 356/350 |
| 4,783,169 | 11/1988 | Matthews et al. | 356/350 |
| 4,793,709 | 12/1988 | Jabr et al. | 356/445 |
| 4,825,260 | 4/1989 | Hendow et al. | 356/350 |
| 4,836,675 | 6/1989 | Hendow et al. | 356/350 |
| 4,963,026 | 10/1990 | Hahn | 356/350 |
| 5,022,033 | 6/1991 | Hackell | 372/94 |
| 5,027,360 | 6/1991 | Nabors et al. | 372/32 |

OTHER PUBLICATIONS

Brochure—"SF2.1 Single Frequency Eye Safe Laser for Heterodyne Detection", Schwartz Electro-Optics, Inc., (May 21-25, 1990) Distributed to Public at a CLEO Conference, Anaheim. Also attached is a copy of the front sheets of the CLEO Conference Publication.

Siegman, "Lasers", Chapter 29, Laser Injection Locking, 1986, University Science Books, pp. 1129-1170.

Lachambre et al., "Injection Locking and Mode Selection in TEA-$CO_2$ Laser Osillators", IEEE J. Quantum Electron. QE-12, pp. 756-764 (Dec. 1976).

Menzies, et al., "Atmospheric Aerosol Backscatter Measurements Using a Tunable Coherent $CO_2$ Lidar, Applied Optics Article,"Aug. 1, 1984, vol. 23, No. 15, pp. 2510-2517.

Post, et al., "Optimizing a Pulsed Doppler Lidar", Applied Optics Article, Oct. 1, 1990, vol. 29, No. 28, pp. 4145-4158.

Bilbro et al., "Airborne Doppler Lidar Measurements", Applied Optics Article, Nov. 1, 1986, vol. 25, No. 21, pp. 3952-3957.

*Primary Examiner*—Georgia Y. Epps
*Attorney, Agent, or Firm*—Edmund W. Rusche

[57] ABSTRACT

A method and apparatus is presented whereby control of the frequency of pulses emitted by a resonant ring slave laser is forced to a single frequency defined by a seed laser through the control of the pathlength of the ring laser resonant path. By monitoring the time difference between turn on of a Q-switch within the laser resonant cavity and the time of occurrence of the output pulse of the slave laser, and effecting changes to the ring laser resonant path in a manner to minimize the measured time difference, the frequency of the output pulse from the slave laser is driven to a single frequency defined by the seed laser resonator.

9 Claims, 4 Drawing Sheets

FLASH-
LAMP
PUMP
OUTPUT

Q-SWITCH
TRANS-
MISSION

LASER
OUTPUT

FREQUENCY STABILIZED HO:YAG LASER

BACKGROUND OF THE INVENTION

Holmium (Ho), thulium (Tm), and chromium (Cr) doped yttrium aluminum garnet (Ho:Tm:Cr:YAG) laser operates at a wavelength of 2.09µ. Although, in the host YAG crystal Ho is codoped with Tm and Cr, the laser is called Ho:YAG because 2.09µ is a Ho fluorescence line. This 2.09µ wavelength is considered eye-safe and therefore, is considered useable for commercial laser radar applications.

In order to use the laser in a heterodyne detection mode, it is required to operate at a narrow bandwidth. Generally, such a narrow line width laser is a called a single frequency laser, and this invention relates to the reduction of laser line width to accomplish obtaining a high energy single frequency laser source. Presently, a high power, high repetition rate, single frequency Ho:YAG laser does not exist. Low power, continuous wave (CW) lasers are under development at various laboratories at the time of this invention.

It is an object of this invention to present a method and apparatus for providing a high power, high repetition rate, single frequency laser source.

Another object of the present invention is to present a method and apparatus for providing such a high power single frequency laser source for use in eye-safe conditions.

A further object of this invention is to present an invention which provides a method and apparatus for a high power, eye-safe, single frequency laser source for use in interferometric detection systems in atmospheric and laser radar applications.

FIELD OF THE INVENTION

This invention relates to a laser source for use in an interferometric system whereby the laser source provides a powerful pulse of optical energy at a single frequency considered eye-safe and therefore suitable for laser radar applications.

SUMMARY OF THE INVENTION

This invention presents a specialized laser source for use in interferometric or heterodyne detection modes. The laser emits single frequency pulses of high power with high repetition rate capability. It also provides for the generation of a laser wavelength signal considered eye-safe and suitable for use in general atmospheric laser radar applications.

The laser consists of two laser components. A high power, flashlamp pumped slave laser also called the power amplifier, and a low power, diode pumped seed laser also called the master oscillator. The master oscillator/power amplifier system is designed such that it operates at a narrow bandwidth wavelength defined by the selected seed laser. In the present embodiment, the seed laser material is holmium. The purpose of the seed laser is to establish a single frequency at which the slave laser will operate.

The slave laser is a flashlamp pumped Ho:YAG laser utilizing a ring resonant configuration which allows for direct and simple laser seeding. This configuration also minimizes backward interaction between the slave and seed lasers and results in efficient extraction of a single longitudinal mode for the slave laser.

The output beam from the resonator cavity is monitored by a detector which feeds its measure of the output beam intensity to a microcontroller. The microcontroller is connected to monitor and control a PZT resonant mirror which is part of the resonant ring configuration and a Q-switch in the resonant ring path.

The methodology used for locking the slave laser frequency to the single frequency seed laser is to reduce the time difference between turn-on of transmission for the Q-switch and the occurrence of the Q-switch pulse output from the ring resonator. This time difference is determined by the microcontroller from the detector measurements and the control cycle for the Q-switch.

This time differential as measured can be changed by altering the resonant pathlength within the slave laser resonant cavity. Altering this pathlength is accomplished by adjustment of the PZT mounted mirror under the control of the microcontroller.

Depending on the time difference measured by the microcontroller the position of the PZT mounted mirror can be changed in predetermined steps between each triggered laser pulse. The slave laser is operating at the seed laser frequency when this time difference is minimum.

DESCRIPTION OF THE PREFERRED EMBODIMENT OF THE INVENTION

This invention presents a novel technique and apparatus of adjusting a slave laser to emit high energy pulses at a single frequency set by a reference seed laser. Fundamental for the implementation of this invention is the use of an optical platform of high stability properties, a time difference measuring device connected with a controller which is implemented to create changes in the pathlength of a ring resonant laser path for the seed laser.

Figure 1:
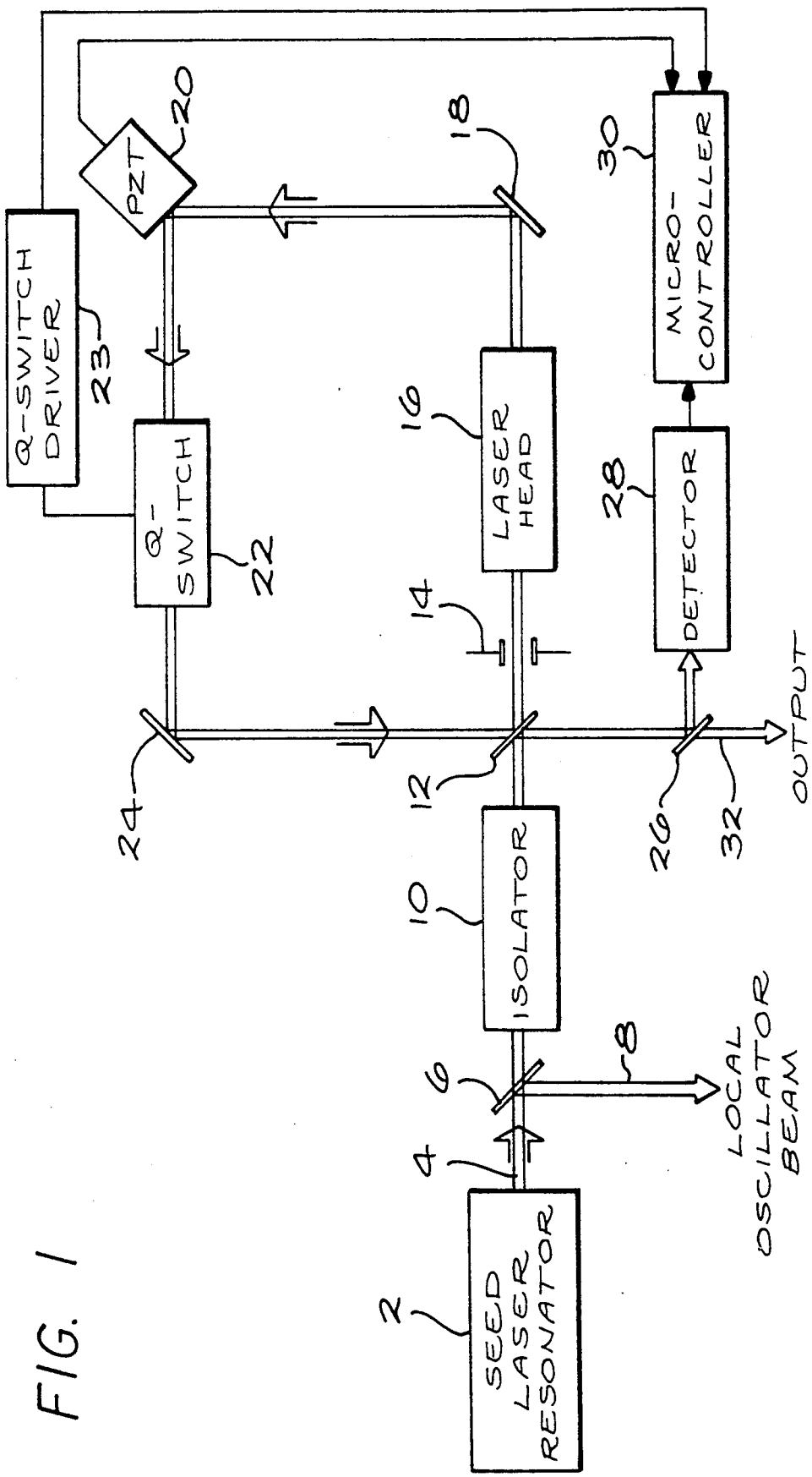
FIG. 1 shows the laser system comprising the seed laser and slave laser circuits.

FIG. 1 shows the preferred embodiment used for this invention. Shown are a seed laser resonator 2 and an isolator 10 making up the seed laser portion of the configuration. The slave laser portion of the embodiment comprises the ring resonant circuit containing laser head 16, mirrors 18 and 24, a piezoelectric transducer with a mounted resonator mirror 20, a Q-switch 22 and its driver 23, a beam splitter 12, and an aperture 14. Most important to this invention and associated with the slave laser resonant ring is the combination of a beam splitter 26, a detector 28, and a microcontroller 30. Also of importance is the need to mount the optical ring laser on a highly stable platform such as one made from Invar.

In the preferred embodiment seed laser 2 comprised a holmium (Ho), thulium (Tm), and chromium (Cr) doped yttrium aluminum garnet (Ho:Tm:Cr:YAG) laser operating at a wavelength of 2.09µ. The seed laser 2 was diode pumped and directed its output beam 4 towards beam splitter 6. At beam splitter 6 a local oscillator beam 8 could be reflected for use in interferometric heterodyning with a slave laser output pulse 32. An isolator 10 was placed to ensure that back reflections from the slave laser were minimized or eliminated.

Figure 2:
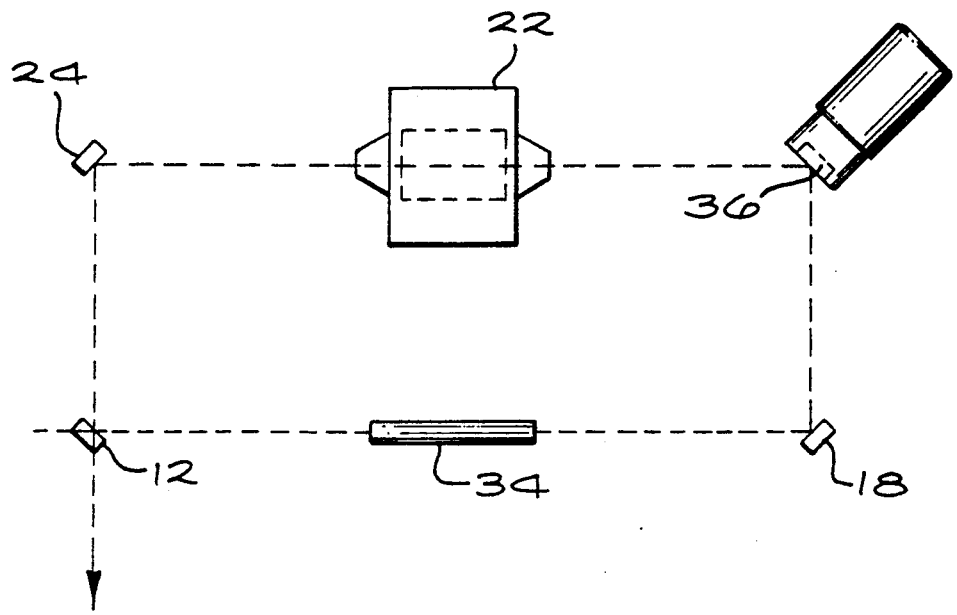
FIG. 2 shows the optical plan of the seed laser.

Referring also to FIG. 2, the resonant ring of the slave laser circuit was comprised of beam splitter 12 through which seed laser output beam 4 entered for control of the slave laser frequency. Laser head 16 comprised a flashlamp (not shown) and a holmium rod 34 to generate the desired high intensity output.

For each pulse cycle, the flashlamp of laser head 16 would be turned on to activate holmium rod 34 of laser head 16. At a select time $T_1$ following activation of holmium rod 34, microcontroller 30 would activate or turn on Q-switch 22 through Q-switch driver 23 to allow resonant transmission of the laser beam within the resonant ring cavity. When Q-switch 22 was turned on resonance in the cavity occurred and the intensity of the cavity laser beam would build up at certain modes of frequency dependent upon the pathlength of the ring cavity. These allowed cavity modes would generally not correspond to the seed laser control frequency desired.

In this manner, a pulse would build up in the ring cavity and be emitted through beam splitter 12 as an output high intensity laser pulse 32. This output pulse was intercepted by a second beam splitter 26 which diverted part of said output pulse to detector 28.

Detector 28 is connected to microcontroller 30 and provided microcontroller 30 the opportunity to identify the time of occurrence of output pulse 32. Microcontroller 30 then determined the time difference between turn-on of Q-switch 22 and the occurrence of high energy output laser pulse 32.

Figure 3A:
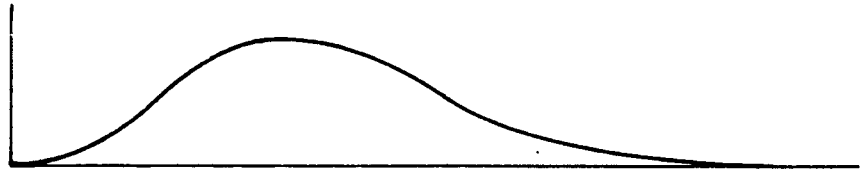
FIG. 3a–3c is a series of plots showing the pump output for the flashlamp to the slave laser holmium rod, the Q-switch transmission, and the laser output pulse signal as functions of time.
Figure 3B:
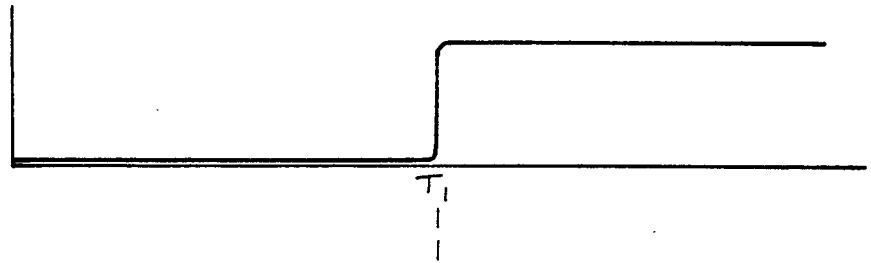
Figure 3C:
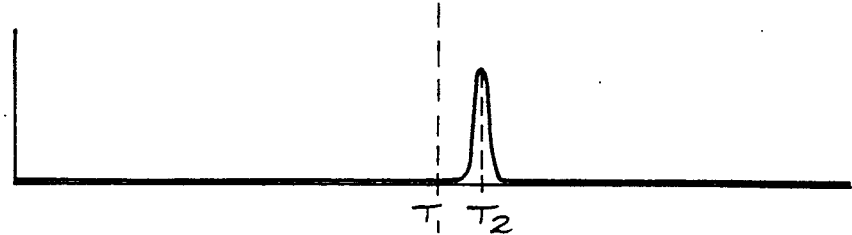

This can be seen more clearly by referring to FIG. 3. FIG. 3a shows the pump output to the flashlamp which activates holmium laser rod 34. As shown the flashlamp is turned on at some time $T_0$ to start a cycle of pulse emission. FIG. 3b shows Q-switch 22 transmission and the time $T_1$ when Q-switch 22 transmission was turned on to allow the high energy laser pulse to build up. FIG. 3c shows a temporal plot of the laser output intensity where the occurrence of the high energy laser pulse which is output occurs at a time $T_2$ which follows time $T_1$ by an amount $\Delta T = T_2 - T_1$.

The microcontroller 30, functioning by programmed control, makes an adjustment in PZT mirror 20 position by a pre-determined amount. Following this, the next cycle of emission of a high energy pulse is started as before.

Again, microcontroller 30 controls operation of Q-switch 22, monitors its turn-on time $T_1$, and measures the occurrence $T_2$ of the output laser pulse. Microcontroller 30 will again adjust the setting of PZT mirror 20 according to the measured time difference $\Delta T$. The object of these iterated measure and control cycles is to minimize the time difference $\Delta T$. When $\Delta T$ is minimized, the condition has been reached where the frequency of the output pulse is equal to the frequency of the seed laser. At this point, the pathlength of the resonant ring slave laser is a multiple of the wavelength of the seed laser signal.

For the preferred embodiment the inventors found that incremental changes in the position of PZT mirror 20 of $\lambda/2$, where in this case $\lambda = 2.09\mu$, was sufficient for minimizing the pathlength. This change in resonator mirror 20 position was performed inbetween each laser output pulse. It is recognized that the incremental changes in the position of PZT mirror 20 can be selected to be any other amount with a primary guiding constraint being to also minimize the amount of time for achieving a minimum in $\Delta T$.

The detector utilized in the preferred embodiment was an InGaAs detector. Also used in the ring resonant circuit was aperture 14 which served to help control longitudinal mode selection.

Figure 4:
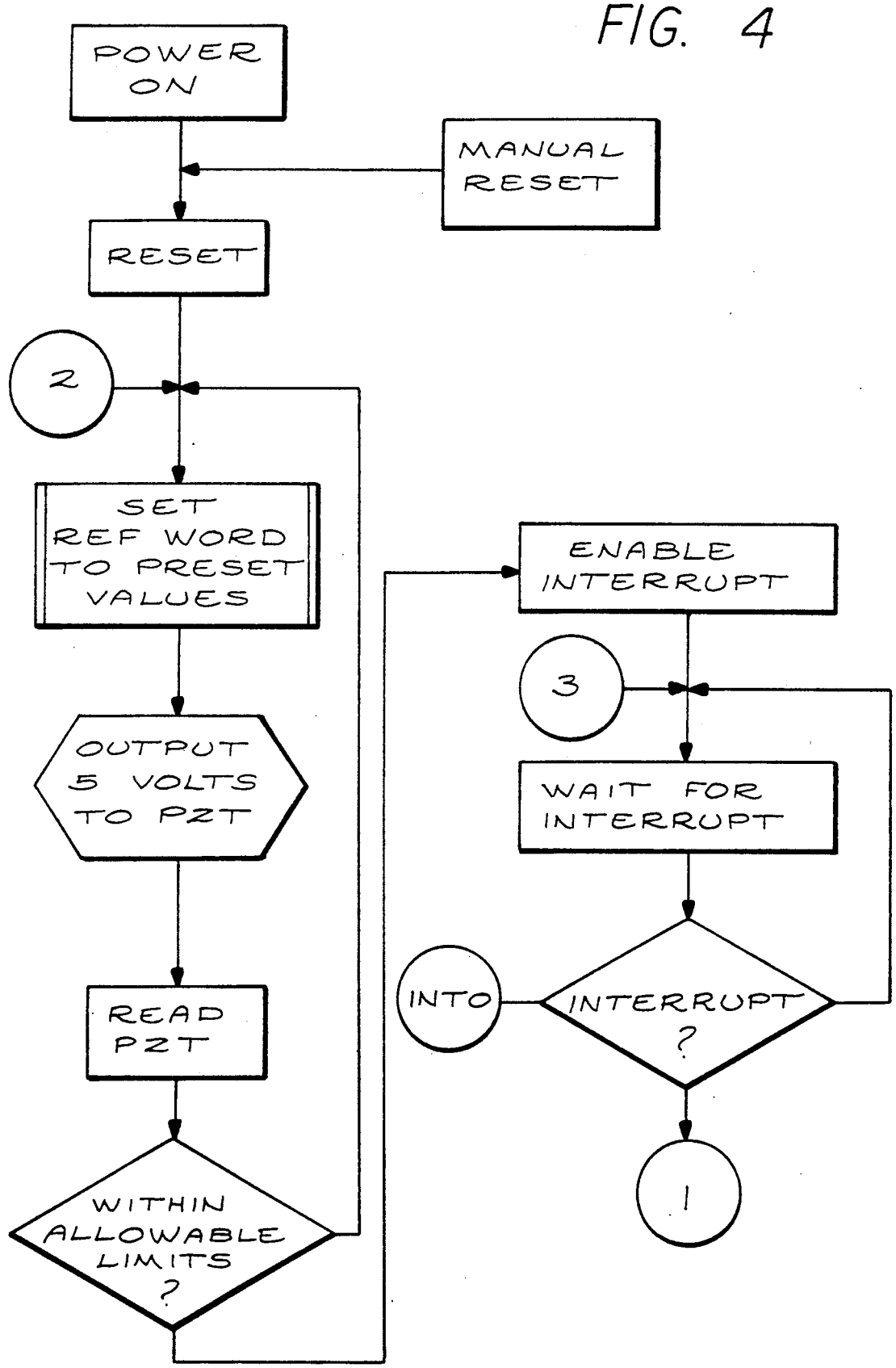
FIGS. 4 and 5 show flow diagrams of the logic process performed by the microcontroller in measuring time difference and operating the PZT.
Figure 5:
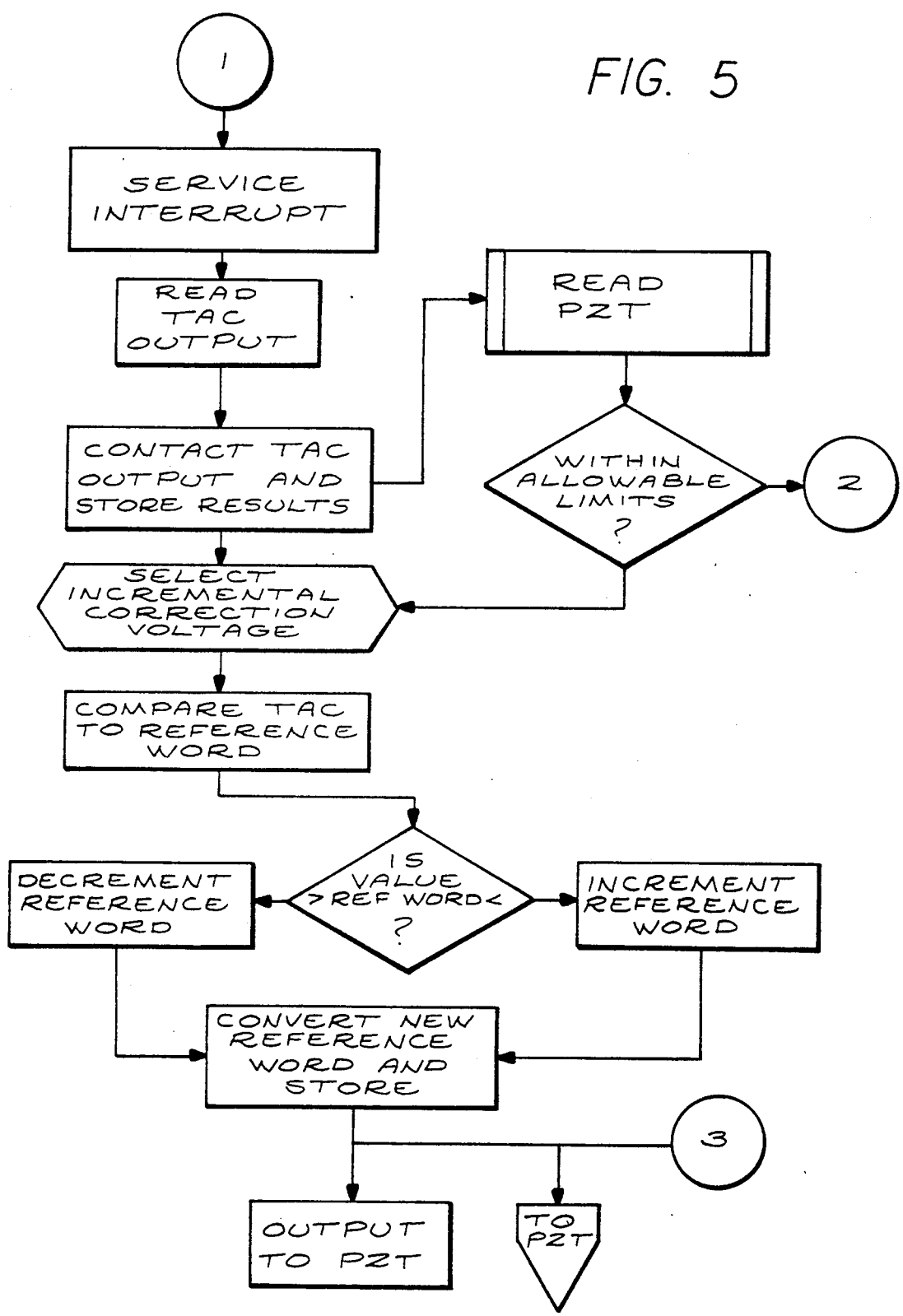

The computer program control within microcontroller 30 is displayed in the logic flow diagrams shown in FIGS. 4 and 5.

While this invention has been described with reference to its presently preferred embodiment its scope is not limited thereto. Rather such scope is only limited insofar as defined by the following set of claims and includes all equivalence thereof.

What is claimed is:

1. A single frequency laser system, wherein high energy pulse signals are generated and output at a single frequency as defined by a seed laser resonator in conjunction with a slave ring laser resonator, which comprises:

a seed laser resonator;

a ring laser resonator serving as a slave laser connected to said seed laser, and having a closed path for its laser beam;

means, serving as part of said ring laser resonator, for switching into and out of resonance said ring laser resonator whereby said high energy output pulses are created;

means for detecting a single said output laser pulse from said ring laser resonator and the time of occurrence of said single output laser pulse;

means for determining a time difference between said time of occurrence of said single output laser pulse and the time said switching means switched into resonance said ring laser resonator whereby said output pulse was created; and means for changing said closed pathlength of said ring laser resonator by a predetermined amount before a next single output laser pulse is created and in a manner to minimize said determined time difference.

2. A single frequency laser system according to claim wherein said seed laser comprises:

a holmium doped laser material selected to emit a preselected single frequency laser signal.

3. A single frequency laser system according to claim wherein said holmium doped laser material comprises:

a holmium, thulium, chromium doped yttrium aluminum garnet.

4. A single frequency laser system according to claim wherein said Holmium doped laser material comprises:

a holmium, thulium, chromium doped yttrium aluminum garnet whereby a wavelength of $2.09\mu$ is emitted.

5. A single frequency laser system according to claim wherein said ring laser resonator comprises:

a plurality of mirrors for guiding a laser beam along said closed path containing a number of path legs equal to the number of mirrors;

a holmium rod positioned in said closed path.

6. A single frequency laser system according to claim wherein said means for switching comprises:

a Q-switch placed in said closed path.

7. A single frequency laser system according to claim wherein said means for determining a time difference comprises:

a programmable microcontroller connected to said means for detecting and said Q-switch, and programmed to output a control signal to said means for changing said closed pathlength.

8. A single frequency laser system according to claim 5 wherein said means for changing said closed pathlength comprises:

a piezoelectric transducer with a mounted resonator mirror positioned as one of said plurality of mirrors, and connected to said programmable microcontroller.

9. A method in a laser system, wherein high energy pulse signals are generated and output at a single frequency as defined by a seed laser resonator in conjunction with a slave ring laser resonator with an adjustable pathlength, which comprises the steps of:

measuring a time $T_1$ at which said slave ring laser resonator is switched into resonance for the formation of a single high energy pulse;

measuring a time $T_2$ when said single high energy pulse is emitted from said laser system;

determining a time difference $T_2 - T_1$;

making a small predetermined change in said pathlength in a manner that tends to minimize $T_2 - T_1$;

and repeating the above steps until $T_2 - T_1$ has reached its minimum value.

* * * * *